US009158586B2

(12) United States Patent
Rothschild

(10) Patent No.: US 9,158,586 B2
(45) Date of Patent: Oct. 13, 2015

(54) SYSTEMS AND METHODS FOR MANAGING CLOUD COMPUTING RESOURCES

(75) Inventor: Keith Alan Rothschild, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 363 days.

(21) Appl. No.: 13/269,947

(22) Filed: Oct. 10, 2011

(65) Prior Publication Data

US 2013/0091284 A1    Apr. 11, 2013

(51) Int. Cl.
*G06F 15/173* (2006.01)
*G06F 9/50* (2006.01)
*G06F 3/06* (2006.01)
*H04L 29/08* (2006.01)

(52) U.S. Cl.
CPC .............. *G06F 9/5005* (2013.01); *G06F 3/067* (2013.01); *G06F 9/5083* (2013.01); *H04L 67/10* (2013.01)

(58) Field of Classification Search
CPC .............................. G06F 9/5083; H04L 67/10
USPC .................................................. 709/224, 226
See application file for complete search history.

(56) References Cited

U.S. PATENT DOCUMENTS

| | | | |
|---|---|---|---|
| 6,205,582 B1 * | 3/2001 | Hoarty | 725/93 |
| 6,314,465 B1 * | 11/2001 | Paul et al. | 709/226 |
| 6,857,020 B1 * | 2/2005 | Chaar et al. | 709/226 |
| 6,951,020 B2 * | 9/2005 | Ricciardi | 719/314 |
| 7,228,441 B2 * | 6/2007 | Fung | 713/300 |
| 2003/0033428 A1 * | 2/2003 | Yadav | 709/238 |
| 2003/0055969 A1 * | 3/2003 | Begun et al. | 709/226 |
| 2006/0048161 A1 * | 3/2006 | de Rose et al. | 718/105 |
| 2006/0227810 A1 * | 10/2006 | Childress et al. | 370/477 |
| 2007/0033282 A1 * | 2/2007 | Mao et al. | 709/226 |
| 2009/0254660 A1 * | 10/2009 | Hanson et al. | 709/226 |
| 2009/0300210 A1 * | 12/2009 | Ferris | 709/235 |
| 2010/0306377 A1 | 12/2010 | DeHaan et al. | |
| 2010/0322255 A1 * | 12/2010 | Hao et al. | 370/398 |
| 2011/0055398 A1 | 3/2011 | DeHaan et al. | |
| 2011/0093586 A1 * | 4/2011 | Garcia-Luna-Aceves et al. | 709/224 |
| 2011/0153828 A1 * | 6/2011 | Park et al. | 709/226 |
| 2011/0154073 A1 * | 6/2011 | Wang et al. | 713/320 |
| 2011/0276951 A1 * | 11/2011 | Jain | 717/140 |
| 2012/0041914 A1 * | 2/2012 | Tirunagari | 706/15 |
| 2013/0086269 A1 * | 4/2013 | Bairavasundaram et al. | 709/226 |

\* cited by examiner

*Primary Examiner* — Joe Chacko
(74) *Attorney, Agent, or Firm* — Sutherland Asbill & Brennan LLP

(57) ABSTRACT

Systems and methods for managing cloud computing resources are provided. A plurality of available cloud computing servers may be identified by a cloud computing resource manager ("CCRM"). The CCRM may include one or more computers. The initiation of one or more processes on one or more servers included in the plurality of cloud computing servers may be directed by the CCRM. Operational data associated with the operation of the one or more processes and network data associated with network timing delays between the one or more servers and one or more client devices in communication with the one or more servers may be obtained by the CCRM. Based at least in part upon the operational data and the network data, the distribution of resources among the plurality of cloud computing servers may be managed by the CCRM.

23 Claims, 7 Drawing Sheets

| Network Distance nominal/congested | | | |
|---|---|---|---|
|  | Client C | Client D | Client F |
| Cluster A | 10/21 | 15/31 | 23/46 |
| Cluster B | 15/31 | 10/21 | 18/36 |
| Cluster E | 10/21 | 15/31 | 7/16 |

SYSTEMS AND METHODS FOR MANAGING CLOUD COMPUTING RESOURCES

TECHNICAL FIELD

Aspects of the invention relate generally to cloud computing, and more particularly, to the management of resources in a cloud computing environment.

BACKGROUND

Cloud-based computing architectures are increasingly being used for a wide variety of different applications. For example, cloud-based architectures are utilized to deliver computing resources to customers and to permit shared processing at a network level. In general, a cloud-based architecture deploys a set of hosted resources, such as processors, operating systems, software, and other components that can be combined together to form virtual machines. Additionally, a wide variety of service providers, such as cable service providers, are considering movement of services to a cloud environment. In this regard, user requests to the service provider, such as video on demand requests, network-based recording requests, and content delivery requests, can be processed by one or more virtual machines.

With any cloud computing environment, the management of processing and memory resources must be considered. Typical cloud computing servers utilize a "small-loop" connection. Examples of small-loop cloud services are e-mail services, Web services, and voice services. For small-loop cloud services, time sensitivity is often not a critical factor and resources are optimized around network behavior. However, with the use of cloud computing for "large-loop" applications, the end-to-end loop between a client device and a cloud server is relatively time sensitive. In other words, the ability to receive and respond to client requests in a timely manner becomes a critical factor in the provision of cloud services. Accordingly, improved systems and methods for managing cloud computing resources are desirable. Additionally, improved systems and methods for managing cloud computing resources in a time sensitive large-loop environment are desirable.

BRIEF DESCRIPTION

Some or all of the above needs and/or problems may be addressed by certain embodiments of the invention. Embodiments of the invention may include systems and methods for managing resources in a cloud computing environment. In one embodiment, a method for managing cloud computing resources may be provided. A plurality of available cloud computing servers may be identified by a cloud computing resource manager ("CCRM"). The CCRM may include one or more computers. The initiation of one or more processes on one or more servers included in the plurality of cloud computing servers may be directed by the CCRM. Operational data associated with the operation of the one or more processes and network data associated with network timing delays between the one or more servers and one or more client devices in communication with the one or more servers may be obtained by the CCRM. Based at least in part upon the operational data and the network data, the distribution of resources among the plurality of cloud computing servers may be managed by the CCRM.

In accordance with another embodiment of the invention, a system for managing cloud computing resources may be provided. The system may include at least one memory and at least one processor. The at least one memory may be configured to store computer-executable instructions. The at least one processor may be configured to access the at least one memory and execute the computer-executable instructions to: identify a plurality of available cloud computing servers; identify one or more processes executed on one or more servers included in the plurality of cloud computing servers; obtain operational data associated with the operation of the one or more processes and network data associated with network timing delays between the one or more servers and one or more client devices in communication with the one or more servers; and manage, based at least in part upon the operational data and the network data, the distribution of resources among the plurality of cloud computing servers.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
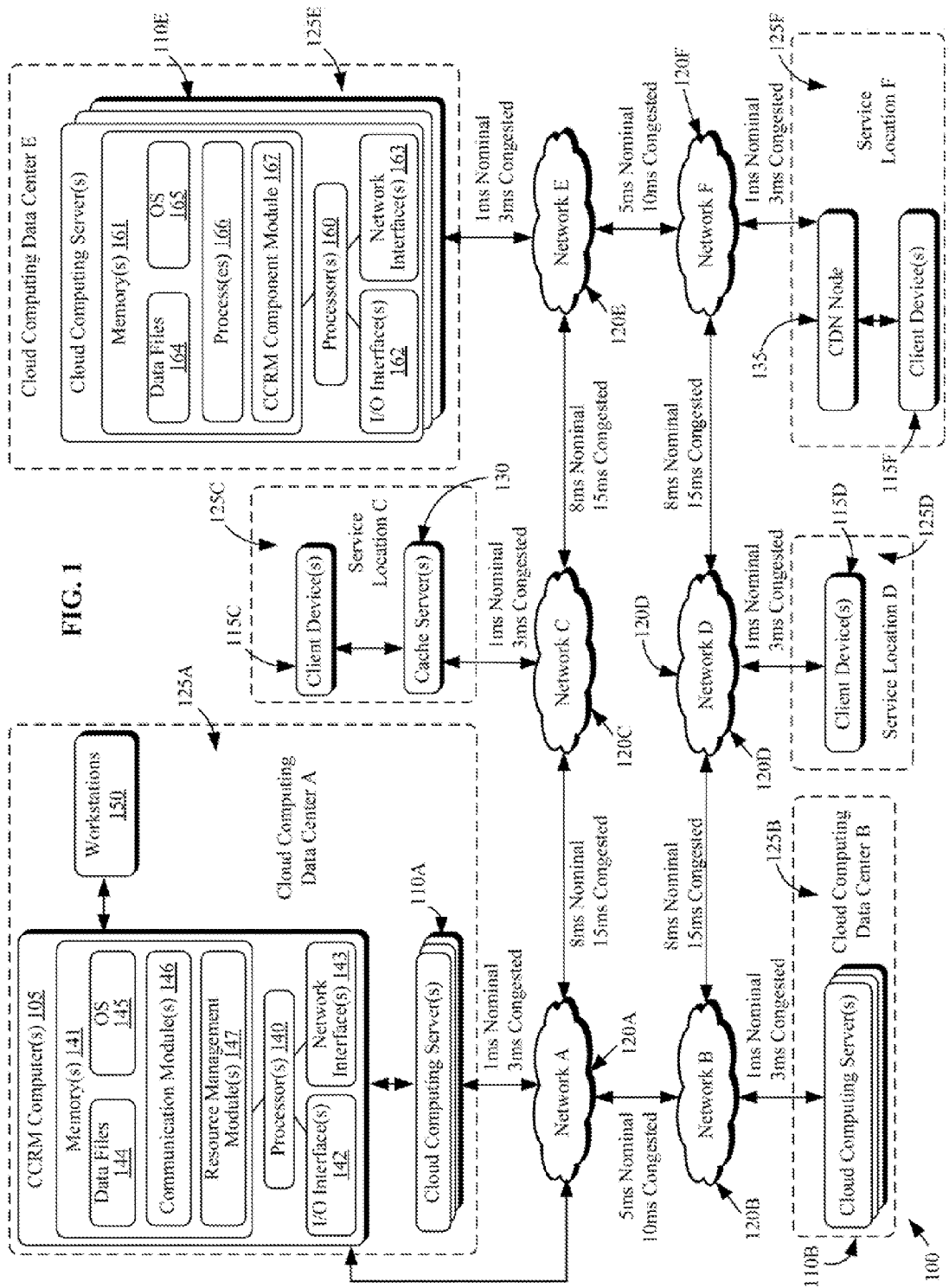
FIG. 1 illustrates a block diagram of an example system that may be utilized to facilitate the management of resources in a cloud computing environment, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for managing resources in a cloud computing environment. In certain embodiments, a cloud computing resource manager ("CCRM") may be provided to facilitate the distribution and/or management of resources in a cloud computing environment. For example, the CCRM may direct the initiation of any number of processes on available cloud servers and/or the allocation of resources to the cloud servers. As desired, the CCRM may evaluate a wide variety of data to facilitate the distribution and/or management of resources. In certain embodiments, the CCRM may obtain operational data associated with the operation of one or more cloud processes and network data associated with timing delays between the cloud servers and any number of client devices in communication with the cloud servers. The CCRM may then utilize the operational data and network data to manage the distribution of resources. In this regard, resources may be distributed in order to facilitate timing requirements of a large-loop system. For example, timing requirements associated with a cable distribution network may be taken into consideration when distributing cloud resources.

As desired in various embodiments, a wide variety of different types of operational data may be obtained. Examples of suitable operational data include data associated with allocated memory resources, data associated with available memory resources, and data associated with processor utilization. In certain embodiments, the operational data may include one or more indications associated with resource thresholds associated with one or more cloud servers. For example, an indication that the resource requirements of a cloud server have exceeded a predetermined threshold or an indication that the resource requirements are expected to exceed a predetermined threshold may be received. In addition to obtaining operational data associated with the cloud servers and cloud processes executed by the cloud servers, in certain embodiments, data associated with the execution of any number of non-cloud processes may be obtained and evaluated. For example, data associated with processes that are not associated with cloud interface functionality may be obtained and evaluated in order to facilitate the management of resources.

In addition to receiving operational data, a wide variety of different types of timing information may be evaluated by the CCRM. For example, time delay information between various devices and/or networks associated with the cloud computing environment may be determined and/or evaluated. In this regard, the CCRM may determine a likely network timing delay or latency between any number of client devices and cloud servers. These timing delays may be taken into consideration during a determination of cloud servers that will provide services to various client devices. Additionally, in certain embodiments, one or more events associated with changes or increases in timing delays may be identified. For example, a congested mode that increases timing delays may be identified. Additionally, timing delay thresholds and/or various timing requirements for one or more client devices may be determined, and resources may be distributed based at least in part upon the timing delays, timing delay events, and/or timing delay thresholds. For example, if it is determined that an unacceptable timing delay between a cloud server and a client device will occur based upon a likely congestion event, then the CCRM may transition the client device to another cloud server associated with a lower timing delay.

A wide variety of suitable control actions may be taken by the CCRM in order to facilitate the management of resources. For example, one or more processes that require additional resources may be identified, and additional resources may be allocated to one or more servers executing the processes. As another example, based upon a determination that one or more processes require additional resources, additional instances of the processes may be initiated on additional cloud servers. As yet another example, a process may be transitioned from a first cloud server to a second cloud server. As desired, load balancing may be performed between multiple instances of a process. Additionally, priorities associated with various processes may be identified, and resources may be distributed in accordance with the identified priorities. As desired in various embodiments, the CCRM may additionally generate any number of utilization reports associated with the available and/or managed cloud servers.

System Overview

An example system 100 for facilitating the management of resources in a cloud computing environment will now be described illustratively with respect to FIG. 1. The system 100 may include, for example, one or more cloud computing resource manager ("CCRM") computers 105, any number of cloud computing servers 110A, 110B, 110E, and/or any number of client devices 115C, 115D, 115F. In general, the cloud computing servers 110A, 110B, 110E may be configured to provide cloud-based processing and/or functionality to the client devices 115C, 115D, 115F, and the CCRM computers 105 may be configured to manage the distribution of resources among the cloud computing servers 110A, 110B, 110E. Additionally, any number of suitable networks 120A-F may facilitate communications between the various components of the system 100.

As desired, the various components of the system 100 may be situated at any number of suitable network locations. For example, as illustrated at FIG. 1, the CCRM computers 105 and a first group of one or more cloud computing servers 110A may be situated at a first location 125A (also referred to as cloud computing data center A); a second group of one or more cloud computing servers 110B may be situated at a second location 125B (also referred to as cloud computing data center B); a first group of one or more client devices 115C may be situated at a third location 125C (also referred to as service location C); a second group of one or more client devices 115D may be situated at a fourth location 125D (also referred to as service location D); a third group of one or more cloud computing servers 110E may be situated at a fifth location 125E (also referred to as cloud computing data center E); and a third group of one or more client devices 115F may be situated at a sixth location 125F (also referred to as service location F). The arrangement of components illustrated in FIG. 1 is provided by way of example only. It will be appreciated that any number of the various components may be utilized and that the various components may be situated in any number of suitable network locations.

Additionally, as mentioned above, any number of suitable networks, such as illustrated networks 120A-F, may facilitate communication between the various components of the system 100. As desired, these networks 120A-F may include any number of public and/or private networks. Example networks include, but are not limited to, cable networks, satellite networks, telecommunication networks, data networks, wide area networks, the Internet, public switched telephone networks, satellite networks, and/or any combination thereof and may be wired and/or wireless. In certain embodiments, the networks 120A-F may include one or more private networks and/or backbone networks associated with a service provider (e.g., a cable service provider, etc.) that operates and/or directs the operations of the cloud computing servers 110A, 110B, 110E. Additionally, as desired, any number of suitable devices, such as gateways and/or routers, may be provided to facilitate connectivity between or among networks.

A wide variety of suitable network configurations may be utilized as desired in various embodiments. Additionally, various network configurations may be associated with different timing delays between network components. As one example, with reference to FIG. 1, a first network 120A (also referred to as network A) may facilitate connection of the components of the first location 125A; a second network 120B (also referred to as network B) may facilitate connection of the components of the second location 125B; a third network 120C (also referred to as network C) may facilitate connection of the components of the third location 125C; a fourth network 120D (also referred to as network D) may facilitate connection of the components of the fourth location 125D; a fifth network 120E (also referred to as network E) may facilitate connection of the components of the fifth location 125E; and a sixth network 120F (also referred to as network F) may facilitate connection of the components of the sixth location 125F. Additionally, any given network may be in communication with one or more other networks via any number of suitable inter-network connections. For example, with reference to FIG. 1, the first network 120A may be in communication with the second network 120B and the third network 120C; the second network 120B may be in communication with the first network 120A and the fourth network 120D; the third network 120C may be in communication with the first network 120A and the fifth network 120E; the fourth network 120D may be communication with the second network 120B and the sixth network 120F; the fifth network 120E may be in communication with the third network 120C and the sixth network 120F; and the sixth network 120F may be in communication with the fourth network 120D and the fifth network 120E. Any number of other suitable network connections may be utilized as desired. Additionally, as desired, the networks may form a single cloud or a plurality of clouds associated with a cloud computing environment.

According to an aspect of the invention, the connectivity between the various networks 120A-F and/or components of the system 100 via the networks 120A-F may result in network latency and/or timing delays. Additionally, a wide variety of factors and/or parameters may affect the network timing delays. For example, as network traffic increases and various networks become congested, the timing delays associated with the networks may increase. These timing delays, identified changes in the timing delays, and/or expected changes to the timing delays may be taken into consideration during the distribution of resources among the cloud computing servers 110A, 110B, 110E by the CCRM computers 105. FIG. 1 illustrates example timing delays associated with the network connections. For each network connection, an example nominal delay (e.g., a delay based on relatively normal network traffic) and an example congested delay are illustrated. For example, as illustrated, the connection between the first network 120A and the second network 120B may be associated with a nominal timing delay of approximately five milliseconds (5 ms) and a congested delay of approximately ten milliseconds (10 ms). Other example delays are illustrated for the various network connections. Additionally, it will be appreciated that the illustrated delays are provided by way of example only and that other delays may be associated with various network connections.

As desired in various embodiments, any number of suitable devices and/or systems may facilitate connection of one or more client devices to one or more suitable networks, such as a service provider backbone network. Alternatively, one or more client devices may be directly connected to one or more suitable networks. With reference to FIG. 1, certain client devices 115C may communicate with one or more suitable cache servers 130 or Web caches that facilitate connection of the client devices 115C to one or more suitable networks 120C. Other client devices 115D may be directly connected to one or more suitable networks. Yet other client devices 115E may be connected to one or more suitable networks 120F via any number of suitable content delivery network ("CDN") nodes 135 or other suitable devices associated with a service provider (e.g., a cable service provider, etc.).

Any number of CCRM computers 105 may be provided as desired in various embodiments of the invention. A CCRM computer 105 may be a suitable processor-driven device configured to collect information associated with the cloud computing servers 110A, 110B, 110E and various timing delays and to facilitate the management and distribution of resources between the cloud computing servers 110A, 110B, 110E. Examples of suitable processor-driven devices that may be utilized as a CCRM computer 105 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the CCRM computer 105 may form a special purpose computer or other particular machine that is operable to facilitate management of the distribution of resources within a cloud computing operating environment.

In addition to one or more processors 140, the CCRM computer 105 may include one or more memory devices 141, one or more input/output ("I/O") interfaces 142, and/or one or more network interfaces 143. The processors 140 may be configured to execute any number of software applications and/or computer-readable or computer-executable instructions. The memory devices 141 may include any number of suitable memory devices, such as caches, read-only memory devices, random access memory devices, flash memory devices, magnetic storage devices, etc. The memory devices 141 may store data, executable instructions, and/or various program modules utilized by the processors 140. Examples of data that may be stored by the memory devices 141 include data files 144 and/or any number of suitable data repositories (e.g., databases, etc.). Additionally, the memory devices 141 may be configured to store any number of suitable program modules and/or applications that may be executed by the processors 140, such as an operating system ("OS") 145, one or more communication modules 146, and/or one or more resource management modules 147.

The data files 144 may include any suitable data that facilitates the operation of the CCRM computer 105. Examples of suitable information stored in the data files 144 include, but are not limited to, information associated with the operation of the cloud computing servers 110A, 110B, 110E, information associated with available cloud resources, information associated with utilized resources, information associated with expected resource utilization or resource requirements, information associated with cloud processes, information associated with non-cloud processes, priority information associated with various processes, information associated with the client devices 115C, 115D, 115E, customer profile information, large-loop timing requirement information (e.g., timing thresholds for responding to client device requests, etc.), information associated with one or more networks 120A-F, network timing delay information, network status information (e.g., normal operating mode information, congested operating mode information, etc.), and/or expected timing delay information.

The OS 145 may be a suitable software module that controls the general operation of the CCRM computer 105. The OS 145 may also facilitate the execution of other software modules by the processors 140, for example, the communication module(s) 146 and/or the resource management module(s) 147. The one or more communication modules 146 may be suitable software modules that facilitate the establishment of a communications session with any number of other components of the system 100. For example, the communication modules 146 may facilitate communications via any number of suitable networks, such as the networks 120A-F illustrated in FIG. 1. Additionally, as desired, the communication modules 146 may host communications sessions with other components of the system 100, such as the various cloud computing servers 110A, 110B, 110E. In this regard, the communication modules 146 may facilitate the receipt of operational information from the cloud computing servers 110A, 110B, 110E. Additionally, the communication modules 146 may facilitate the communication of instructions (e.g., resource allocation instructions, load balancing instructions, process initiation instructions, etc.) to the various, cloud computing servers 110A, 110B, 110E.

The resource management modules 147 may include any number of suitable software modules or applications that facilitate the management of cloud computing resources. As desired, a resource management module 147 may manage respective resources of one or more individual clouds. Additionally, as desired, a resource management module 147 may manage the collective resources of a plurality of clouds. A wide variety of suitable management operations may be performed by the resource management module 147, such as process initialization, resource allocation, and/or load balancing. According to an aspect of the invention, timing delays and/or timing requirements (e.g., timing sensitivities associated with a large loop system, etc.) may be taken into consideration by the resource management module 147 during the management of cloud computing resources.

In operation, the resource management module 147 may receive and evaluate a wide variety of data to facilitate the distribution and/or management of resources. In certain embodiments, the resource management module 147 may obtain operational data associated with the operation of one or more cloud processes on the cloud computing servers 110A, 110B, 110E and/or network data associated with timing delays between the cloud computing servers 110A, 110B, 110E and any number of client devices 115C, 115D, 115F in communication with the cloud computing servers 110A, 110B, 110E. The resource management module 147 may then utilize the operational data and network data to manage the distribution of resources. In this regard, resources may be distributed in order to facilitate timing requirements of a large-loop system. For example, timing requirements associated with a cable distribution network may be taken into consideration when distributing cloud resources.

As desired in various embodiments, a wide variety of different types of operational data may be obtained and evaluated by the resource management module 147. Examples of suitable operational data include data associated with allocated memory resources, data associated with available memory resources, data associated with available processing resources, and/or data associated with processor utilization. In certain embodiments, the operational data may include one or more indications associated with resource thresholds associated with one or more cloud computing servers 110A, 110B, 110E. For example, an indication that the resource requirements of a cloud computing server have exceeded a predetermined threshold or an indication that the resource requirements are expected to exceed a predetermined threshold may be received. In addition to obtaining operational data associated with the cloud computing servers 110A, 110B, 110E and cloud processes executed by the cloud computing servers 110A, 110B, 110E, in certain embodiments, data associated with the execution of any number of non-cloud processes may be obtained and evaluated by the resource management module 147. For example, data associated with processes that are not associated with cloud interface functionality may be obtained and evaluated in order to facilitate the management of resources.

In addition to receiving operational data, a wide variety of different types of timing information may be evaluated by the resource management module 147. For example, time delay information between various devices and/or networks associated with the cloud computing environment may be determined and/or evaluated. In this regard, the resource management module 147 may identify and/or determine likely network timing delays or latencies between the client devices 115C, 115D, 115F and cloud computing servers 110A, 110B, 110E. These timing delays may be taken into consideration during a determination of cloud computing servers 110A, 110B, 110E that will provide services to various client devices 115C, 115D, 115F. Additionally, in certain embodiments, one or more events associated with changes or increases in timing delays may be identified. For example, a congested mode that increases timing delays may be identified. Additionally, timing delay thresholds and/or various timing requirements for one or more client devices 115C, 115D, 115F may be determined, and resources may be distributed based at least in part upon the timing delays, timing delay events, and/or timing delay thresholds. For example, if it is determined that an unacceptable timing delay between a cloud computing server and a client device will occur based upon a likely congestion event, then the resource management module 147 may transition the client device to another cloud computing server associated with a lower timing delay.

A wide variety of suitable control actions may be taken by the resource management module 147 in order to facilitate the management of resources. For example, one or more processes that require additional resources may be identified, and additional resources may be allocated to one or more cloud computing servers executing the processes. As another example, based upon a determination that one or more processes require additional resources, additional instances of the processes may be initiated on additional cloud computing servers. As yet another example, a process may be transitioned from a first cloud computing server to a second cloud computing server. As desired, load balancing may be performed between multiple instances of a process. Additionally, priorities associated with various processes may be identified, and resources may be distributed in accordance with the identified priorities.

As desired in various embodiments, the resource management module 147 may additionally generate any number of utilization reports associated with the available and/or managed cloud servers. In this regard, situations in which additional cloud computing resources should be added (e.g., additional hardware) or reallocated may be identified. For example, a technician reviewing a utilization report may identify situations in which resource capacity should be increased, and the technician may request or direct the addition (e.g., hardware upgrade, new hardware implementation, etc.) or reallocation of cloud computing hardware.

Embodiments of the invention may be implemented in a wide variety of suitable operating environments and/or in association with a wide variety of different services. Utilizing an example of a cable service provider system, it may be possible to move certain cable video infrastructure to a cloud. For example, components that do not directly interface with a hybrid fiber cable ("HFC") network may be moved to a cloud. In other words, components configured to interface with customer devices (e.g., broadband modems, gateway devices, set-top boxes, etc.) via an Internet protocol ("IP") network may be moved to a cloud. In this regard, a wide variety of cable services may be moved to a cloud.

As one example, certain aspects of video on demand ("VOD") navigation may be moved to a cloud. A consumer or customer may utilize a suitable client device to establish upstream communication with a VOD server. The VOD server may communicate with a VOD back-office, which may, in-turn, communicate with a billing system. In this regard, the VOD server may permit the client device to browse available VOD content and/or to purchase available content. If streaming is available, the VOD server may communicate with a suitable VOD storage device and/or a video pump or distribution component that facilitates downstream communication of the content to the client device. In certain embodiments of the invention, various VOD functionality, such as VOD back-office functionality, billing system functionality, VOD storage functionality, and/or video pump functionality, may be moved to one or more clouds. Additionally, given timing requirements of a VOD system, timing delays over communication links for the cloud VOD functionality may be critical considerations in providing VOD functionality. A suitable CCRM computer 105 and/or associated resource management module 147 may take these timing delays and/or timing requirements into consideration when instituting processes associated with cloud VOD functionality (e.g., VOD back-office functionality, video pump functionality, etc.) and/or in the allocation of resources.

A few examples of the operations that may be performed by a suitable resource management module 147 are described in greater detail below with reference to FIGS. 3-7.

With continued reference to the CCRM computer 105, the one or more I/O interfaces 142 may facilitate communication between the CCRM computer 105 and one or more input/output devices, for example, one or more user interface devices, such as a display, keypad, mouse, pointing device, control panel, touch screen display, remote control, microphone, speaker, etc., that facilitate user interaction with the CCRM computer 105. In this regard, user commands may be received by the CCRM computer 105. The one or more network interfaces 143 may facilitate connection of the CCRM computer 105 to one or more suitable networks 120A, such as a suitable backbone network, that facilitate communication with other networks and/or other components of the system 100.

In certain embodiments, one or more workstations 150 or other user devices (e.g., personal computers, mobile devices, tablet computers, etc.) may be provided. A workstation 150 may provide a suitable human machine interface ("HMI") to the CCRM computer 105. In this regard, a technician or other individual may utilize the workstation 150 to provide instructions to the CCRM computer 105 and/or to view information output by the CCRM computer 105. For example, a workstation 150 may be utilized to provide resource management preferences to the CCRM computer 105. As another example, a workstation 150 may be utilized to view utilization report information generated by the CCRM computer 105.

With continued reference to FIG. 1, any number of suitable cloud computing servers 110A, 110B, 110E may be provided. An example cloud computing server (referred to as cloud computing server 110) may be configured to execute one or more cloud processes and/or non-cloud processes. Additionally, the cloud computing server 110 may be configured to provide resource utilization and/or requirement information to the CCRM computer 105. The cloud computing server 110 may additionally be configured to receive and process instructions output by the CCRM computer 105, such as resource allocation instructions and/or load balancing instructions.

The cloud computing server 110 may be a suitable processor-driven device configured to execute any number of processes and/or to provide any number of services to one or more client devices 115C, 115D, 115F. Examples of suitable processor-driven devices that may be utilized as a cloud computing server 110 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the cloud computing server 110 may form a special purpose computer or other particular machine that is operable to provide cloud computing services and/or that is operable to provide resource and/or timing information to the CCRM computer 105.

In addition to one or more processors 160, the cloud computing server 110 may include one or more memory devices 161, one or more input/output ("I/O") interfaces 162, and/or one or more network interfaces 163. The processors 160 may be configured to execute any number of software applications and/or computer-readable or computer-executable instructions. The memory devices 161 may include any number of suitable memory devices, such as caches, read-only memory devices, random access memory devices, flash memory devices, magnetic storage devices, etc. The memory devices 161 may store data, executable instructions, and/or various program modules utilized by the processors 160. Examples of data that may be stored by the memory devices 161 include data files 164 and/or any number of suitable data repositories (e.g., databases, etc.). Additionally, the memory devices 161 may be configured to store any number of suitable program modules and/or applications that may be executed by the processors 160, such as an operating system ("OS") 165, one or more processes or processing modules 166 (e.g., cloud processes, non-cloud processes, etc.), and/or a CCRM component module 167.

The data files 164 may include any suitable data that facilitates the operation of the cloud computing server 110. Examples of suitable information stored in the data files 164 include, but are not limited to, information associated with the CCRM computer 105, information associated with available resources for the cloud computing server 110 (e.g., available memory, available processing resources, etc.), information associated with utilized resources (e.g., allocated memory, processor utilization), information associated with expected resource utilization or resource requirements, information associated with cloud processes executed by the cloud computing server 110, information associated with non-cloud processes executed by the cloud computing server 110 (e.g., processes that do not include cloud interface functionality such as local processes), information associated with client devices serviced by the cloud computing server 110, information associated with one or more networks 120A-F, network timing delay information, network status information (e.g., normal operating mode information, congested operating mode information, etc.), and/or expected timing delay information.

The OS 165 may be a suitable software module that controls the general operation of the cloud computing server 110. The OS 165 may also facilitate the execution of other software modules by the processors 160, for example, the executed processes 166 and/or the CCRM component module 167. The executed processes 166 or processing modules may include any number of suitable software modules that are executed by the cloud computing server 110 to facilitate a wide variety of desired functionality. According to an aspect of the invention, the processes 166 may include one or more cloud processes. As desired, a cloud process may be any suitable process configured to provide a service or processing functionality to other components of a cloud. For example, a cloud process may provide a service to one or more client devices and/or to one or more other components of a cloud computing environment. Additionally, as desired in various embodiments, the processes 166 may include one or more non-cloud processes. A non-cloud process may be a process that does not include cloud interface functionality (e.g., a local process, etc.); however, the non-cloud process may occupy resources of the cloud computing server 110.

The CCRM component module 167 may include any number of suitable software modules or applications that facilitate interaction between the cloud computing server 110 and the CCRM computer 105. In operation, the CCRM component module 167 may collect information associated with available and/or utilized resources of the cloud computing server 110, as well as information associated with expected resource demand. Additionally, the CCRM component module 167 may collect information associated with timing delay information and/or expected timing delay information associated with the cloud computing server 110, as well as various timing threshold information (e.g., minimum timing delays, etc.) associated with communication between the cloud computing server 110 and one or more client devices. At least a portion of the information collected by the CCRM component module 167 may be output for communication to the CCRM computer 105 and/or an associated resource management module 147. In this regard, the resource management module 147 may process the information and facilitate the management and/or distribution of cloud resources.

Additionally, the CCRM component module 167 may be configured to receive a wide variety of instructions output by the CCRM computer 105, such as a request to receive resource and/or timing delay information, instructions associated with the initialization of one or more cloud processes, instructions associated with the allocation of additional resources, and/or instructions associated with the transitioning of resources. The CCRM component module 167 may process a received instruction in order to facilitate a wide variety of operations within a cloud computing environment. For example, the CCRM component module 167 may direct the communication of resource and/or timing delay information to the CCRM computer 105. As another example, the CCRM component module 167 may facilitate the initialization and/or execution of one or more cloud processes on the cloud computing server 110. As yet another example, the CCRM component module 167 may facilitate the transfer of one or more client devices to another cloud computing server executing a suitable cloud process. As yet another example, the CCRM component module 167 may decrease the resources allocated to one or more executing processes, such as one or more relatively low priority processes. Other example operations of the CCRM component module 167 will be appreciated in light of the functionality described below with reference to FIGS. 3-7.

With continued reference to the cloud computing server 110, the one or more I/O interfaces 162 may facilitate communication between the cloud computing server 110 and one or more input/output devices, for example, one or more user interface devices, such as a display, keypad, mouse, pointing device, control panel, touch screen display, remote control, microphone, speaker, etc., that facilitate user interaction with the cloud computing server 110. In this regard, user commands may be received by the cloud computing server 110. The one or more network interfaces 163 may facilitate connection of the cloud computing server 110 to one or more suitable networks, such as one or more of the networks 120A-F illustrated in FIG. 1, that facilitate communication with other networks and/or other components of the system 100.

With continued reference to FIG. 1, any number of suitable client devices or customer devices may be provided, such as the illustrated client devices 115C, 115D, 115F. An example client device (referred to as client device 115) may be a suitable device that facilitates the request and/or receipt of information associated with one or more services offered by a service provider, such as a service provider (e.g., a cable service provider, etc.) associated with one or more cloud computing servers. Examples of suitable client devices include, but are not limited to, a personal computer, a tablet computer, a programming processing component, a set-top box, a virtual set-top box integrated into a television or display device, a broadband modem, a gateway device, etc. Any number of suitable networks, such as one or more of the networks 120A-F illustrated in FIG. 1, may facilitate communications between the client device 115 and one or more suitable cloud computing servers.

As desired, the client device 115 may include components similar to those described above for the CCRM computer 105 and/or the cloud computing server 110. For example, the client device 115 may include one or more processors, one or more memory devices, I/O interfaces, and/or network interfaces. In operation, the one or more processors may execute one or more suitable software programs stored by the one or more memory devices. In this regard, the general operations of the client device 115 may be facilitated. Additionally, the client device 115 may establish communication with any number of suitable cloud computing servers and/or other devices associated with the service provider (e.g., a cache server 130, a CDN node 135, etc.). In this regard, the client device 115 may request a wide variety of services offered by the service provider. Additionally, the client device 115 may provide a wide variety of suitable information to one or more cloud computing servers 110A, 110B, 110E. The client device 115 may also receive a wide variety of information from one or more cloud computing servers 110A, 110B, 110E. Utilizing a cable system as an example, the client device 115 may communicate with one or more cloud computing servers 110A, 110B, 110E in association with cable billing services, video on demand services, pay per view services, parental control services, voice over internet protocol ("VoIP") services, network recording services, and/or any number of other suitable services.

Communications between various components of the system 100 may be facilitated via any number of suitable networks, such as the illustrated networks 120A-F. As desired, these networks 120A-F may include any number of public and/or private networks. Example networks include, but are not limited to, cable networks, satellite networks, telecommunication networks, data networks, wide area networks, the Internet, public switched telephone networks, satellite networks, and/or any combination thereof and may be wired and/or wireless. In certain embodiments, the networks 120A-F may include one or more private networks and/or backbone networks associated with a service provider (e.g., a cable service provider, etc.) that operates and/or directs the operations of the cloud computing servers 110A, 110B, 110E. Additionally, as desired, any number of suitable devices such as gateways and/or routers, may be provided to facilitate connectivity between or among networks.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

According to an aspect of the invention, any number of suitable network configurations may be utilized as desired in various embodiments of the invention. Additionally, any number of suitable network connections may facilitate inter-network communications. The various network connections and/or networks may be associated with various network latencies and/or timing delays. A wide variety of factors and/or parameters may affect the network timing delays. For example, as network traffic increases and various networks become congested, the timing delays associated with the networks may increase. These timing delays, identified changes in the timing delays, and/or expected changes to the timing delays may be taken into consideration during the distribution of resources among the cloud computing servers.

Figure 2:
FIG. 2 is a diagram of example network delays between various components of the cloud computing environment illustrated in FIG. 1, according to an illustrative embodiment of the invention.

FIG. 2 is a diagram 200 of example network delays between various components of the cloud computing environment illustrated in FIG. 1, according to an illustrative embodiment of the invention. With reference to FIG. 2, a few example timing delays are illustrated. The illustrated timing delays are delays associated with the shortest network distances or network paths between example network clusters or network locations. Additionally, the illustrated timing delays include both nominal (i.e., not congested) and congested delays associated with various network distances.

Turning to FIG. 2, an example nominal delay between a first network location 125A and a third network location 125C may be approximately ten milliseconds (10 ms). This delay may be determined, for example, by combining a delay (e.g., approximately 1 ms, etc.) between a CCRM computer 105 or a cloud computing server 110A and the first network 120A, a delay (e.g., approximately 8 ms) between the first network 120A and the third network 120C, and a delay (e.g., approximately 1 ms) between the third network 120C and a suitable client device 115C or cache server 130. Similarly, an example congested delay between the first network location 125A and the third network location 125C may be determined as approximately twenty-one milliseconds (21 ms). Other delays illustrated in FIG. 2 may be determined or calculated in a similar manner.

Operational Overview

Figure 3:
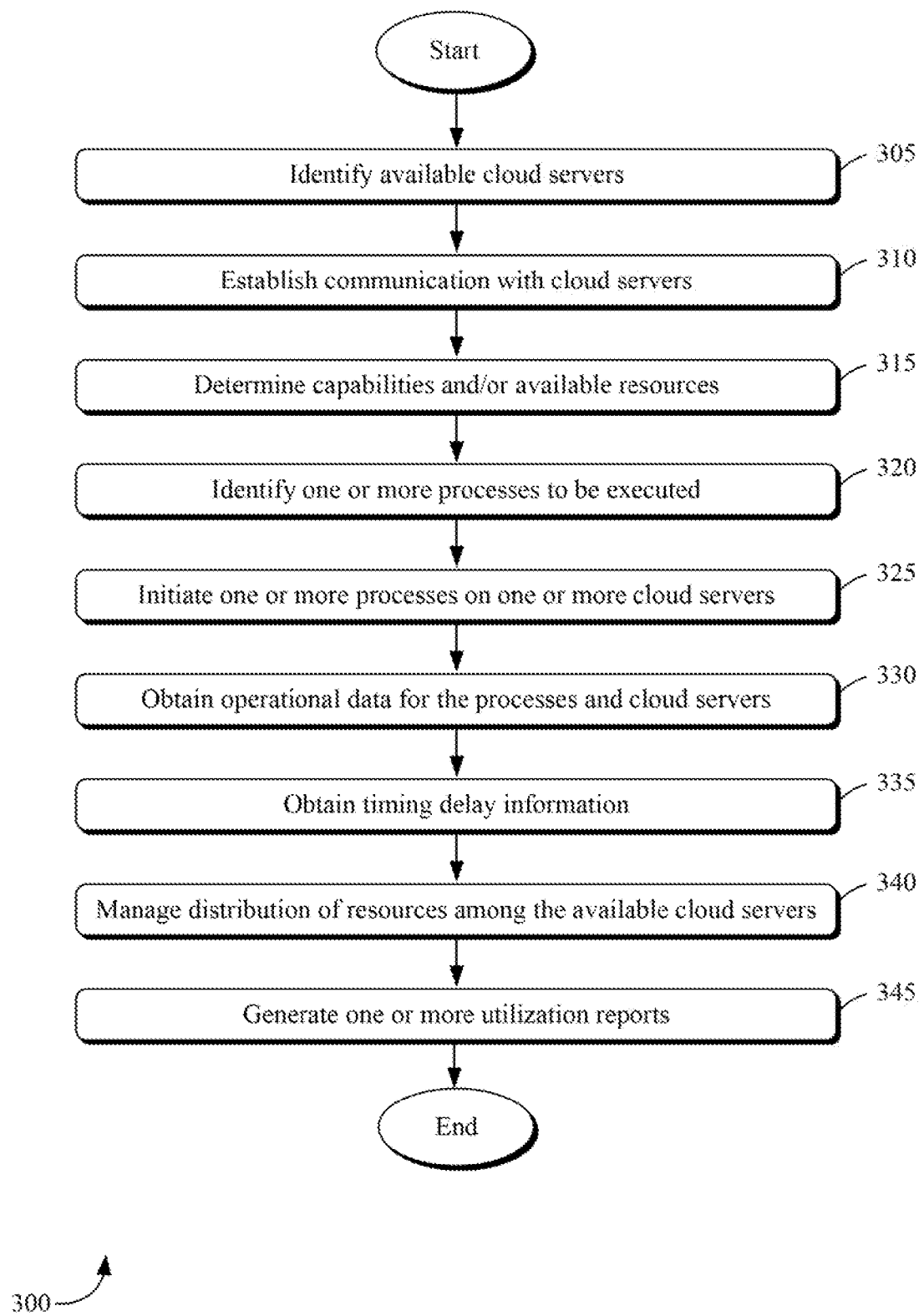
FIG. 3 is a flow diagram of one example method for managing a cloud computing environment, according to an example embodiment of the invention.

FIG. 3 is a flow diagram of an example method 300 for managing a cloud computing environment, such as the cloud computing environment 100 illustrated in FIG. 1. In accordance with the method 300, the distribution of cloud resources may be managed based at least in part upon a wide variety of suitable cloud computing requirements (e.g., necessary resources, process priorities, etc.) and/or a wide variety of network timing delay information. In certain embodiments, the operations of the method 300 may be performed by any number of suitable CCRM computers and/or associated resource management modules, such as the CCRM computers 105 and/or resource management modules 147 illustrated in FIG. 1. The method 300 may begin at block 305.

At block 305, one or more available cloud servers, such as the cloud computing servers 110A, 110B, 110E illustrated in FIG. 1, may be identified. The identified cloud servers may include servers connected to a single cloud or servers associated with a plurality of different clouds. As desired, a wide variety of identification information may be obtained and/or determined for each of the available cloud servers. Examples of suitable information include, but are not limited to, an identifier of the cloud server (e.g., a server name, a server device identifier), an Internet Protocol ("IP") address or other network address for the cloud server, service location and/or cluster identification information associated with the cloud server, and/or information associated with a network path to the cloud server.

At block 310, communication may be established with any number of the identified available cloud servers. In this regard, respective operational data and/or capabilities of the cloud servers may be obtained and/or determined. A wide variety of suitable networks, such as the networks 120A-F illustrated in FIG. 1, and/or suitable communication techniques may be utilized to establish communication with a cloud server. In certain embodiments, communication may be established with a suitable cloud component module executed by a cloud server, such as the CCRM component module 167 illustrated in FIG. 1. The CCRM component module 167 may collect and/or determine a wide variety of information associated with the cloud server, and the CCRM component module 167 may communicate at least a portion of the information to a CCRM computer 105. As desired, data may be collected from a cloud server in real-time, substantially in real-time, upon request, on a periodic basis (e.g., once a minute, etc.) and/or based upon the identification of an event (e.g., a resource request event, an expected resource requirement increase event, etc.).

At block 315, the capabilities and/or capacities of one or more of the identified cloud servers may be determined. For example, processing capabilities and/or total memory resources for any number of cloud servers may be determined based at least in part upon information. Additionally, the utilized and/or available resources for the one or more cloud servers may be determined. For example, processor utilization information and/or information associated with allocated memory resources may be determined. As another example, available processing capacity and/or information associated with available memory resources may be determined. In certain embodiments, the CCRM computer 105 may periodically or dynamically determine the state of the resources associated with the cloud servers, taking into account both utilized and available resources.

At block 320, one or more processes to be executed in a cloud (or in a plurality of clouds) may be identified. In other words, one or more processes to be executed utilizing available cloud resources may be identified. As desired, a wide variety of information associated with each of the one or more processes may be identified or determined. Examples of suitable information for a process include, but are not limited to, a process identifier, initial resource requirements for the process, expected future resource requirements for the process, identified and/or expected customers and/or client devices to be serviced by the process, and/or locations associated with customers and/or client devices. Additionally, in certain embodiments, priority information associated with the one or more processes may be identified or determined. In this regard, resources may be allocated to critical and/or higher priority processes prior to allocating resources to lower priority processes.

At block 325, the CCRM computer 105 may initiate or direct the initiation of one or more processes on any number of suitable cloud servers. For example, the resource management module 147 may generate one or more suitable process initialization requests, and the generated requests may be communicated to the cloud servers. In addition to directing the initiation of a process by a cloud server, resources associated with the cloud server (or controlled by the cloud server) may be allocated for the process. For example, a maximum amount of various resources may be allocated. As desired in various embodiments, the resource management module 147 may take a wide variety of information into consideration to select the one or more cloud servers to be utilized to execute each process, such as available resource information for the cloud servers, process resource requirements information, client device information (e.g., information for client devices that have requested and/or are expected to request services associated with the processes, etc.), and/or network path and/or timing delay information associated with connections between the client devices and the cloud servers. In this regard, the resource management module 147 may perform a wide variety of load balancing and/or critical timing operations during the initialization of one or more processes. For example, different instances of the same process may be initialized at different service locations in order to provide timely service to various groups of client devices.

At block 330, a wide variety of data associated with the operation of the cloud servers and/or the executed processes may be received. For example, operational data may be received from any number of respective CCRM component modules 167 associated with one or more cloud servers. As desired, a wide variety of suitable techniques may be utilized to receive operational data. For example, operational data may be received in real-time or near real-time, operational data may be periodically received, operational data may be received in response to requests for the data, and/or operational data may be received in accordance with the identification of one or more triggers or events (e.g., an identification of increased resource demand or expected increases in resource demand, a determination that an allocated resource threshold has been reached, etc.). Examples of suitable operational data that may be received include, but are not limited to, resource usage data, processor utilization data, expected resource requirements data (e.g., expected requirements based upon past historical information, etc.), requests for additional resources (e.g., resource requests based upon increased interaction with client devices and/or requests from client devices, etc.), and/or an indication that fewer resources are required. Additionally, in certain embodiments of the invention, operational data may be received for both cloud processes and non-cloud processes (e.g., processes that do not have associated cloud interface functionality). In this regard, a cloud server may execute one or more processes that do not provide cloud-based services to client devices. The operational data (e.g., resource requirements, expected resource requirements, etc.) associated with these non-cloud processes may be communicated by a CCRM component module 167 to the CCRM computer 105 in order to facilitate the management of available cloud resources.

At block 335, a wide variety of timing delay information may be obtained and/or determined by the CCRM computer 105 and/or the resource management module 147. The timing delay information may include information associated with network paths and/or timing delays between various client devices and the cloud servers providing services to those client devices. Additionally, the timing delay information may include a wide variety of information associated with identified events that have increased timing delays and/or that are expected to increase timing delays. For example, an identification of an upcoming congested network event may be received and/or determined. In addition to timing delay information, information associated with timing requirements and/or timing thresholds, such as a maximum timing delay associated with a process or service, may be obtained and/or identified.

At block 340, the distribution of resources among the available cloud servers may be managed by the CCRM computer 105 and/or the resource management module 147. As desired, at least a portion of the operational data and/or at least a portion of the timing delay information may be taken into consideration during the management of resource distribution. In this regard, various timing thresholds and/or timing requirements (e.g., critical end-to-end timing delays, etc.) may be satisfied to the extent possible. Additionally, timing delays may be minimized and/or the allocation of resources may be optimized. A wide variety of suitable actions may be taken as desired to facilitate the management and/or distribution of resources. Example actions include, but are not limited to, allocating additional resources to a cloud server and/or to a process, initiating a new instance of a process (e.g., a new instance on an additional cloud server, etc.), balancing client device load between multiple instances of a process, directing the discontinuation of one or more processes (e.g., lower priority processes), and/or shifting available resources from a lower priority process to a higher priority process. A few example actions are described in greater detail below with reference to FIGS. 4-7; however, additional actions and/or series of actions will be appreciated in light of the disclosure provided herein.

At block 345, one or more utilization reports may be generated. For example, one or more resource and/or cloud server utilization reports may be generated based at least in part upon operational data; timing delay information, and/or resource distribution data. As desired, a wide variety of suitable information may be included in a utilization report, including but not limited to, resource requirements information, resource allocation information, processing power utilization information, timing information, and/or information associated with distribution actions taken by the CCRM computer 105. Once generated a utilization report may be provided to any number of suitable recipients and/or recipient devices via any number of suitable communications channels. For example, a utilization report may be communicated to a workstation computer or another device associated with a service provider technician. In this regard, situations in which additional cloud computing resources should be added (e.g., additional hardware) or reallocated may be identified. For example, a technician reviewing a utilization report may identify situations in which resource capacity should be increased, and the technician may request or direct the addition (e.g., hardware upgrade, new hardware implementation, etc.) or reallocation of cloud computing hardware.

The method 300 may end following block 345.

Figure 4:
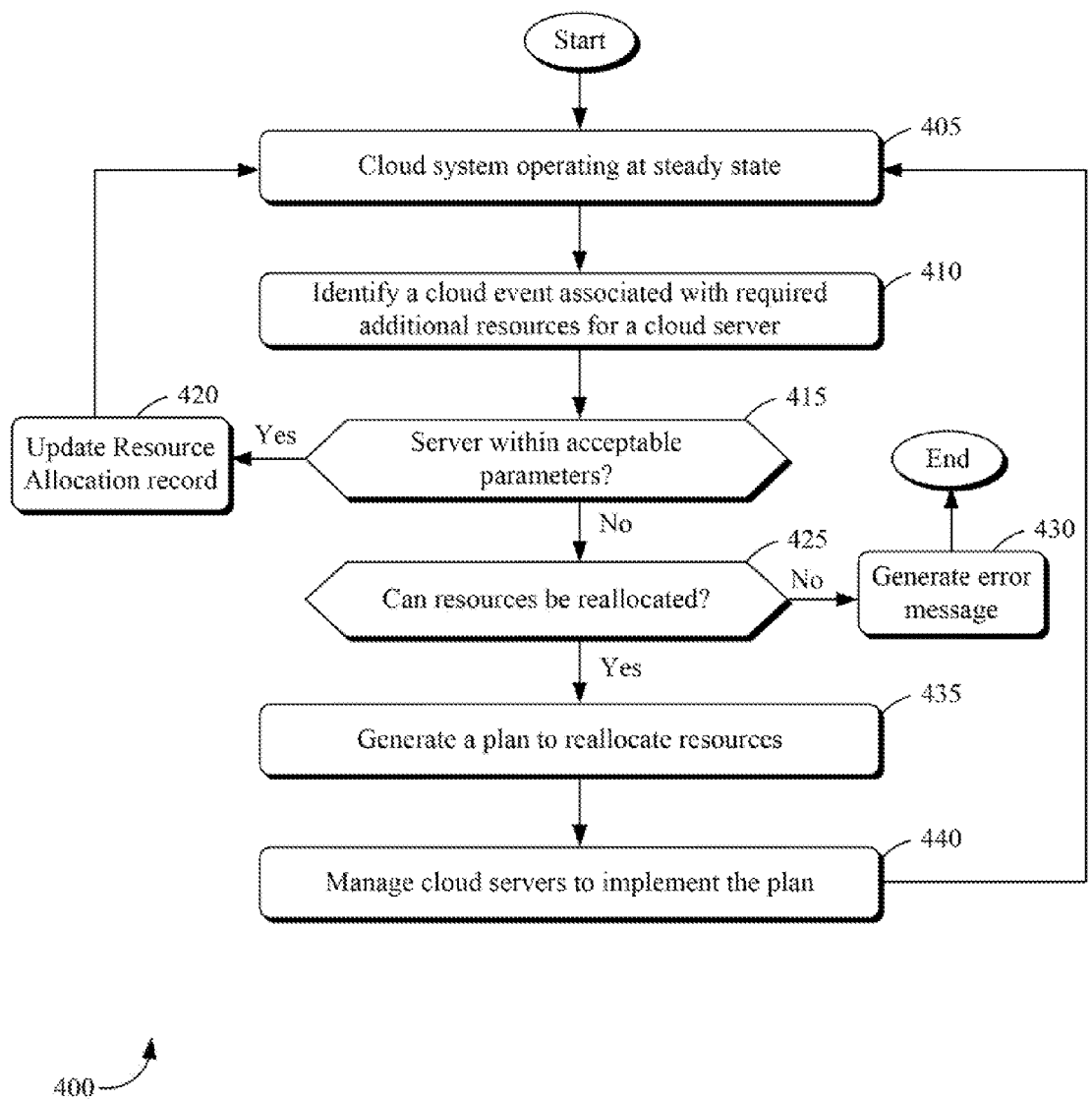
FIG. 4 is a flow diagram of one example method for managing the allocation of resources in a cloud computing environment, according to an example embodiment of the invention.

FIG. 4 is a flow diagram of one example method 400 for managing the allocation of resources in a cloud computing environment, such as the cloud computing environment 100 illustrated in FIG. 1. In certain embodiments, the operations of the method 400 are one example of the operations that may be performed at block 340 illustrated in FIG. 3. As such, the method 400 may be performed by any number of suitable CCRM computers and/or associated resource management modules, such as the CCRM computers 105 and/or resource management modules 147 illustrated in FIG. 1. The method 400 may begin at block 405.

At block 405, a cloud computing system or cloud computing environment 100 may be operating at a steady state. For example, a CCRM computer 105 may direct and/or assign the distribution of cloud resources (e.g., allocated memory and/or processing resources) among any number of suitable cloud servers, such as the cloud computing servers 110A, 110B, 110E illustrated in FIG. 1. Additionally, the CCRM computer 105 may direct the initiation of any number of processes on the cloud servers. Following the distribution of resources and/or the initiation of processes, the cloud computing environment may enter a relatively steady state that is subject to additional evaluation by the CCRM computer 105.

At block 410, a cloud event associated with additional resource requirements may be identified. The cloud event may be associated with additional resource requirements for a cloud server in communication with the CCRM computer 105. The additional resource requirements may be associated with one or more processes executed by a cloud server, such as one or more cloud processes (e.g., virtual server processes, etc.) and/or one or more non-cloud processes. In certain embodiments, an indication that additional resources are being allocated by the cloud server, such as an allocation to a non-cloud process, may be received. Additionally, in certain embodiments, a request for additional resources may be received from the cloud server by the CCRM computer 105. In other embodiments, resource utilization information associated with the cloud server may be evaluated, and a determination may be made that one or more resource utilization thresholds have been met.

At block 415, a determination may be made as to whether the cloud server is operating within one or more acceptable operational parameters. For example, a determination may be made as to whether the resources utilized by the cloud server for any number of cloud processes and/or non-cloud processes satisfy one or more operational thresholds, such as thresholds associated with maximum allocated resources. As another example, a determination may be made as to whether processing speed requirements are satisfied by the cloud server. Additionally, as desired, a determination may be made as to whether additional resources are available on the cloud server. If it is determined at block 415 that the cloud server is operating within one or more acceptable operational parameters, then operations may continue at block 420. At block 420, a resource allocation record associated with the cloud server may be updated to account for the additional resources utilized by the cloud server. Operations may then continue at block 405, and the cloud system may return to steady state operation.

If, however, it is determined at block 415 that the cloud server is not operating within one or more acceptable operational parameters, then operations may continue at block 425. At block 425, a determination may be made as to whether cloud resources may be reallocated. For example, a determination may be made as to whether processing being performed by the cloud server may be moved or transitioned to one or more additional cloud servers. As desired, a transitioning determination may take available resources and timing delay considerations into account. As one example, a determination may be made as to whether resources associated with additional cloud servers are available. Utilizing timing delay information associated with the additional cloud servers and one or more client devices, a determination may then be made as to whether one or more timing thresholds (e.g., critical timing requirements, etc.) may be satisfied in the event that processing performed by the cloud server is transitioned to one or more additional servers. As another example of operations that may be performed at block 425, a determination may be made as to whether the allocation of resources to certain processes executed by the cloud server may be decreased. For example, a determination may be made as to whether one or more lower priority processes may be halted.

If it is determined at block 425 that cloud resources may not be reallocated, then operations may continue at block 430. At block 430, an error message may be generated, and the error message may be communicated to one or more suitable recipients, such as a technician associated with the cloud computing environment 100. A wide variety of suitable information may be included in an error message, such as identifiers of relevant cloud servers, resource requirements, timing information, and/or an indication of resource allocation shortfalls. In certain embodiments, the error message may raise an alert to a technician or operator that facilitates manual intervention within the cloud computing environment. For example, a technician may manually override existing resource allocations.

If, however, it is determined at block 425 that cloud resources may be reallocated, then operations may continue at block 435. At block 435, a plan to reallocate cloud resources within the cloud computing environment 100 and/or among available cloud servers may be generated. The plan may be a plan that is attempted to bring the cloud server operating outside of acceptable operating parameters within the acceptable operating parameters. As set forth above, the plan may take a wide variety of operational data, available resource data, timing delay information, and/or timing requirements into consideration. In certain embodiments, the generated plan may optimize or attempt to optimize the distribution of resources among available cloud servers in order to provide satisfactory response time between the cloud servers and any number of client devices. Additionally, the plan may include a wide variety of suitable operations, such as the initialization of processes on one or more additional cloud servers, the transitioning of processing to one or more additional cloud servers, the swapping of performed processing between a plurality of cloud servers, the performance of load balancing operations between a plurality of cloud servers, and/or the halting, slowing, or discontinuation of one or more lower priority processes.

Once a plan to reallocate resources has been generated at block 435, operations may continue at block 440. At block 440, the generated plan may be implemented or executed. For example, the CCRM computer 105 may manage the operation of the cloud servers in accordance with the generated plan. As desired, the plan may be modified or updated during the implementation of the plan. Additionally, status information and/or resource allocation records associated with any number of cloud servers may be updated in accordance with the plan implementation. Following the implementation of the plan, operations may continue at block 405, and the cloud system may return to steady state operation.

The method 400 may end following block 430 or, optionally following either block 420 or block 440.

Figure 5:
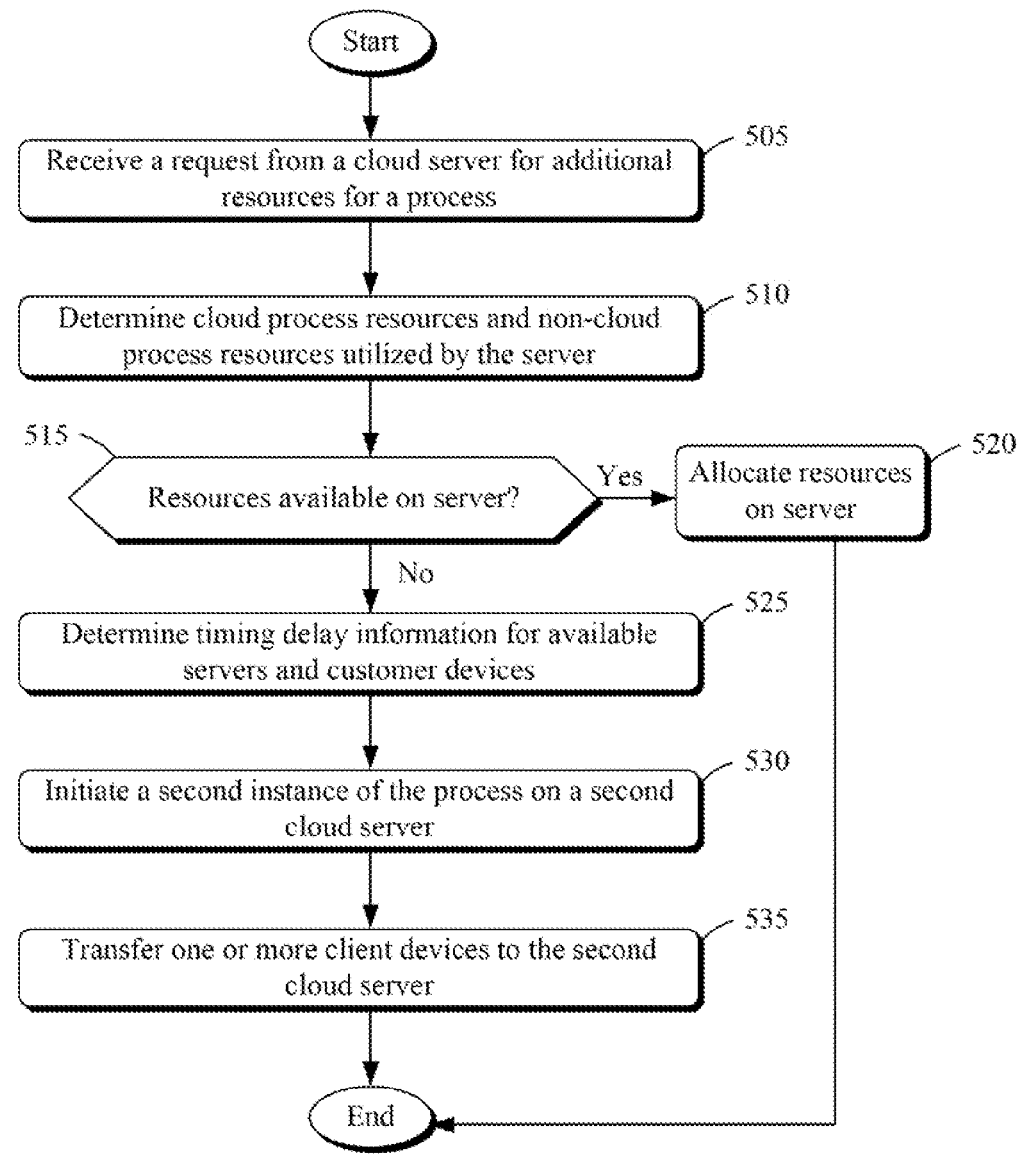
FIG. 5 is a flow diagram of another example method for managing the allocation of resources in a cloud computing environment, according to an example embodiment of the invention.

FIG. 5 is a flow diagram of another example method 500 for managing the allocation of resources in a cloud computing environment, such as the cloud computing environment 100 illustrated in FIG. 1. In certain embodiments, the operations of the method 500 are one example of the operations that may be performed at block 340 illustrated in FIG. 3. As such, the method 500 may be performed by any number of suitable CCRM computers and/or associated resource management modules, such as the CCRM computers 105 and/or resource management modules 147 illustrated in FIG. 1. The method 500 may begin at block 505.

At block 505, a request for additional resources may be received by the CCRM computer 105 from a cloud server, such as one of the cloud computing servers 110A, 110B, 110E illustrated in FIG. 1. The request may be associated with at least one cloud process being executed by the cloud server. Additionally, as desired, a wide variety of suitable information may be included in the request, such as information associated with resources currently being utilized by the cloud server, information associated with one or more amounts of requested resources, information associated with client devices in communication with the cloud server, information associated with network communication paths between the client devices and the cloud server, and/or timing information (e.g., timing delay information, timing threshold information, etc.) associated with communications between the cloud server and the client devices and/or the provision of services to the client devices.

At block 510, the resources that are currently being utilized by the cloud server may be determined. These resources may include resources (e.g., memory resources, processing resources, etc.) allocated to the cloud server for one or more cloud processes. Additionally, in certain embodiments, the resources may include resources utilized by the server to execute one or more non-cloud processes. In addition to determining utilized resources, total available resources and/or unallocated resources may be determined by the CCRM computer 105.

At block 515, a determination may be made as to whether resources are available on the cloud server to fulfill or satisfy the request for additional resources. For example, a determination may be made as to whether the request for additional resources may be satisfied by allocating unallocated resources of the cloud server. If it is determined at block 515 that resources are available on the cloud server to fulfill or satisfy the request for additional resources, then operations may continue at block 520. At block 520, the CCRM computer 105 may direct the allocation of available resources on the cloud server in response to the received request for additional resources. As desired, a resource allocation record associated with the cloud server may be updated by the CCRM computer 105. Operations may then end following block 520.

If, however, it is determined at block 515 that resources are not available on the cloud server to fulfill or satisfy the request for additional resources, then operations may continue at block 525. At block 525, timing delay information associated with any number of available cloud servers May be determined. For example, timing delay information between the requesting cloud server and one or more client devices or customer devices may be determined. Additionally, timing delay information between one or more additional cloud servers and the one or more client devices may be determined. Additionally, as desired, various timing thresholds and/or timing requirements (e.g., end-to-end timing requirements, etc.) associated with one or more services provided by the cloud process may be determined.

At block 530, the CCRM computer 105 may direct the initiation of a second instance of the cloud process on a second cloud server. As desired, available resource information associated with the second cloud server, as well as timing delay information may be taken into consideration when selecting the second cloud server. For example, a second cloud server with resource capacity that is capable of providing a cloud process server in accordance with one or more timing requirements may be identified. A second instance of the cloud process may then be initiated on the second cloud server. Additionally, as desired, the initiation of additional instances of the process is not limited to a single additional cloud server. Instead, a plurality of additional instances of the process may be initiated on any number of additional cloud servers. As desired, one or more suitable resource allocation records may be updated based upon the initiations of the additional instances of the process.

At block 535, one or more client devices serviced by the cloud process executing on the cloud server that requested additional resources may be transferred to the second cloud server (or any number of additional cloud servers). In certain embodiments, all of the client devices may be transferred, and the first instance of the cloud process may be discontinued. In other embodiments, a portion of the client devices may be transferred. Additionally, as desired, timing delay information may be taken into consideration during a selection of one or more client devices to be transferred. For example, expected timing delays for the client devices following a transfer may be evaluated, and the client devices with the lowest expected timing delays may be transferred. Operations may then end following block 535.

The method 500 may end following either block 520 or block 535.

Figure 6:
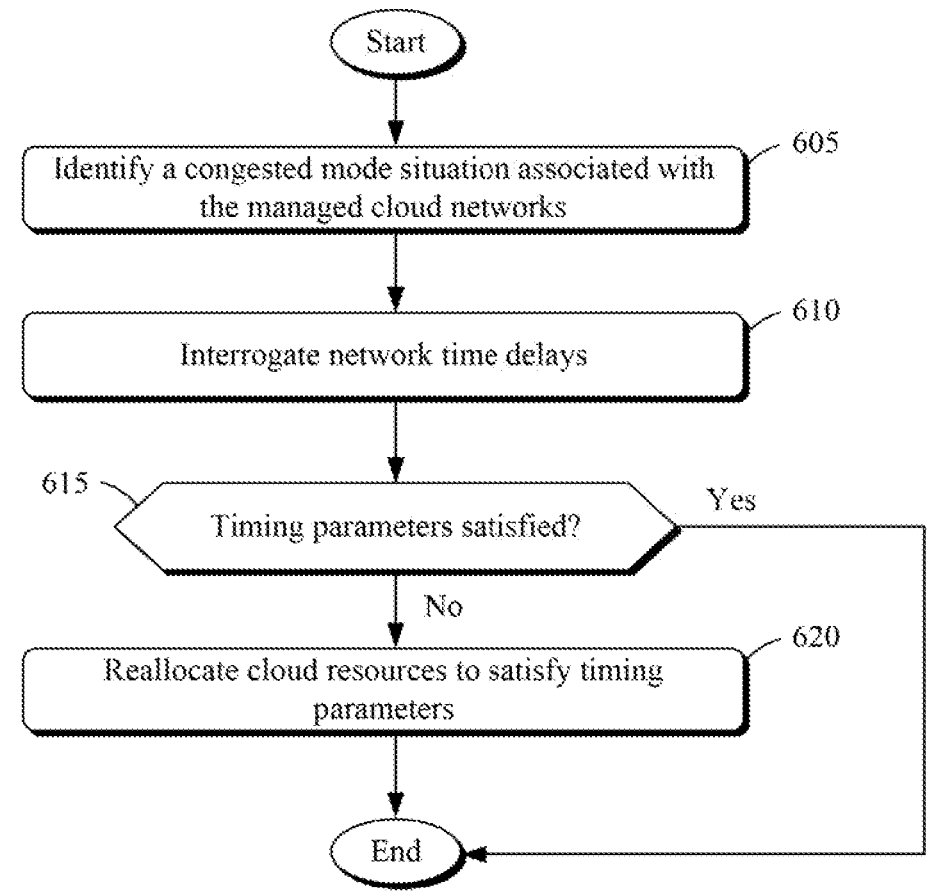
FIG. 6 is a flow diagram of another example method for managing the allocation of resources in a cloud computing environment, according to an example embodiment of the invention.

FIG. 6 is a flow diagram of another example method 600 for managing the allocation of resources in a cloud computing environment, such as the cloud computing environment 100 illustrated in FIG. 1. In certain embodiments, the operations of the method 600 are one example of the operations that may be performed at block 340 illustrated in FIG. 3. As such, the method 600 may be performed by any number of suitable CCRM computers and/or associated resource management modules, such as the CCRM computers 105 and/or resource management modules 147 illustrated in FIG. 1. The method 600 may begin at block 605.

At block 605, an event associated with increased network timing delays, such as delays in one or more of the networks 120A-F illustrated in FIG. 1, may be identified. For example, a congested mode or a relatively high latency mode associated with one or more managed cloud networks may be identified. As another example, a likely or expected congested mode may be identified, for example, by evaluating historical network timing delay information and/or based upon expected demand data and/or resource allocation requests received from any number of cloud servers, such as the cloud computing servers 110A, 110B, 110E illustrated in FIG. 1.

At block 610, the CCRM computer 105 and/or the resource management module 147 may interrogate and/or otherwise determine any number of suitable network timing delays associated with the cloud network(s) included in the cloud computing environment 100. For example, current timing delays between various components and/or network locations may be determined. A wide variety of suitable methods and/or techniques may be utilized as desired to interrogate or determine timing delays. For example, one or more timing information and/or timing delay requests may be communicated to various cloud servers. The cloud servers may then determine timing delays (e.g., determine by utilizing test messages and monitoring response time, etc.) between the cloud servers and any number of client devices or other network locations, and information associated with the timing delays may be returned to the CCRM computer 105. In this regard, the CCRM computer 105 may generate a suitable map, table, or other logical data construct that includes various timing delay information associated with the cloud computing environment 100.

At block 615, a determination may be made as to whether one or more timing parameters and/or timing requirements are satisfied by the interrogated or determined timing delays. For example, a determination may be made as to whether timing parameters, such as maximum timing delay thresholds associated with one or more cloud services, are satisfied or will be satisfied following the identification of the increased timing delay event. If it is determined at block 615 that the timing parameters are satisfied, then operations may end. If, however, it is determined at block 615 that one or more of the timing parameters are not satisfied, then operations may continue at block 620.

At block 620, any number of cloud resources may be reallocated by the CCRM computer 105 in order to satisfy the timing parameters and/or timing requirements. A wide variety of suitable operations and/or actions may be implemented as desired in order to reallocate cloud resources. For example, additional instances of a cloud process may be instituted, and client devices may be transferred to the additional instances in a manner that satisfies timing parameters. As another example, load balancing may be performed between a plurality of instances of a cloud process. As yet another example, client devices may be assigned to various instances of a cloud process in order to optimize timing delays and/or resource allocation. As desired, one or more suitable resource allocation records may be updated based upon the reallocation of cloud resources.

The method 600 may end following either block 615 or block 620.

Figure 7:
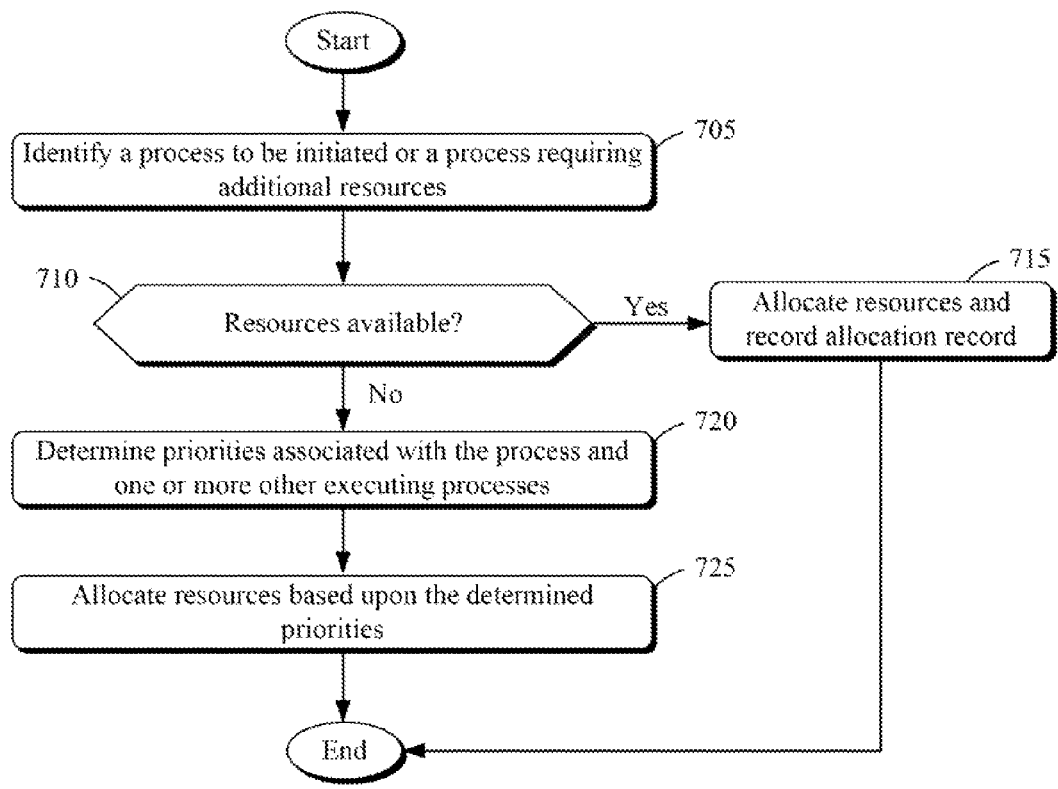
FIG. 7 is a flow diagram of another example method for managing the allocation of resources in a cloud computing environment, according to an example embodiment of the invention.

FIG. 7 is a flow diagram of another example method 700 for managing the allocation of resources in a cloud computing environment, such as the cloud computing environment 100 illustrated in FIG. 1. In certain embodiments, the operations of the method 700 are one example of the operations that may be performed at block 340 illustrated in FIG. 3. As such, the method 700 may be performed by any number of suitable CCRM computers and/or associated resource management modules, such as the CCRM computers 105 and/or resource management modules 147 illustrated in FIG. 1. The method 700 may begin at block 705.

At block 705, a cloud process to be initiated (e.g., a new instance of a cloud process, etc.) or a cloud process requiring additional resources (e.g., a cloud process for which additional resources are requested, a cloud process for which additional resource requirements are predicted, etc.) may be identified. The identified cloud process may be a cloud process executing on a suitable cloud server or a cloud process to be executed on a suitable cloud server, such as one of the cloud computing servers 110A, 110B, 110E illustrated in FIG. 1.

At block 710, a determination may be made as to whether cloud resources are available for the identified process. For example, a determination may be made as to whether cloud resources associated with one or more available cloud servers are available for provision to the identified process. If it is determined at block 710 that cloud resources are available for the identified process, then operations may continue at block 715. At block 715, available resources may be allocated for the identified process. For example, available resources may be allocated to initiate the identified process. As another example, additional resources may be provided to an executing process. Operations may then end following block 715.

If, however, it is determined at block 715 that resources are not available for allocation to the identified process, then operations may continue at block 720. At block 720, respective priorities associated with the identified process and one or more other processes that are being executed by the cloud servers associated with the cloud computing environment 100 may be determined. The priorities may be utilized to identify or determine an order in which resources should be allocated to the various processes. A wide variety of suitable techniques may be utilized to determine process priorities. For example, process identifiers may be utilized to access stored process priorities.

At block 725, available cloud resources may be allocated based at least in part upon the determined priorities. For example, available resources may be allocated to higher priority processes prior to resources being allocated to lower priority processes. As desired, lower priority processes may be discontinued or placed on hold until resources become available. Additionally, one or more suitable resource allocation records may be updated based upon the reallocation of cloud resources. Operations may then end following block 725.

The method 700 may end following either block 715 or block 725.

As one example implementation of the method 700 illustrated in FIG. 7, cloud computing resources may be allocated to a wide variety of low priority virtual machine processes. For example, cloud computing resources may be donated to a tax-deductible effort or to a charitable effort. Processes associated with the donation may be identified as relatively low priority processes. Accordingly, during periods of time in which cloud resources are required for other higher priority processes, the relatively low priority processes may be discontinued or placed on hold. As cloud resources become available, at least a portion of the resources may be provided to the relatively low priority processes.

The operations described and shown in the methods 200, 300, 400, 500, 600, and 700 of FIGS. 2-7 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-7 may be performed. Additionally, as desired, a wide variety of additional methods for managing the distribution of cloud resources may be utilized in association with various embodiments of the invention. For example, a method that utilizes any number of the operations described in FIGS. 2-7 and/or any combination of the operations may be utilized to manage the distribution of cloud resources.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    identifying, by a cloud computing resource manager (CCRM) comprising one or more computers, a plurality of available cloud computing servers;
    directing, by the CCRM, the initiation of one or more processes on a first server of the plurality of cloud computing servers in communication with a second server of the plurality of cloud computing servers over a first communication link, and the second server in communication with a third server of the plurality of cloud computing servers over a second communication link, wherein the first server, the second server, and the third server implement at least a portion of the one or more processes in response to a request from a client device that is remote from the plurality of cloud computing servers;
    obtaining, by the CCRM, operational data associated with the operation of the one or more processes and network data associated with respective network timing delays associated with the first communication link and between the first server and the second server, the second communication link and between the second server and the third server, and a third communication link, the third communication link connecting the client device to at least one of the plurality of cloud computing servers, wherein the operational data comprises one or more indications associated with a resource threshold associated with the first server, the second server, or the third server, wherein the one or more indications comprise an indication that a resource requirement of the first server, the second server, or the third server has exceeded the resource threshold or an indication that a resource requirement of the first server, the second server, or the third server is expected to exceed the resource threshold; and
    managing, by the CCRM based at least in part upon the operational data and the network data, the distribution of resources among the plurality of cloud computing servers, wherein the managing comprising comparing, by the CCRM, the network timing delays with a respective network timing delay threshold to determine the distribution.

2. The method of claim 1, wherein identifying a plurality of available cloud computing servers comprises identifying a plurality of servers associated with a cable distribution network.

3. The method of claim 1, wherein obtaining operational data comprises obtaining at least one of (i) data associated with allocated memory resources, (ii) data associated with available memory resources, or (iii) data associated with processor utilization.

4. The method of claim 1, wherein obtaining operational data comprises receiving an indication that the resource requirements of at least one of the first server, the second server, or the third server have exceeded the network timing delay threshold or that the resource requirements are expected to exceed the network timing delay threshold.

5. The method of claim 1, wherein the one or more processes comprise one or more first processes having associated cloud interface functionality, and further comprising:
    obtaining, by the CCRM, data associated with the resource requirements of one or more second processes operating on at least one of the first server, the second server, or the third server, wherein the one or more second processes do not have associated cloud interface functionality,
    wherein managing the distribution of resources comprises managing the distribution of resources based at least in part upon the data associated with the one or more second processes.

6. The method of claim 1, wherein managing the distribution of resources comprises:
    identifying, by the CCRM, a process included in the one or more processes that requires additional resources; and
    allocating, by the CCRM, additional resources to a server executing the process.

7. The method of claim 1, wherein managing the distribution of resources comprises:
    identifying, by the CCRM, a process included in the one or more processes that requires additional resources, wherein the process is executing on the first server; and
    initiating, by the CCRM, a second instance of the process on a fourth server-included in the plurality of cloud computing servers.

8. The method of claim 7, further comprising:
    directing, by the CCRM, a transitioning of the process from the first server to the fourth server.

9. The method of claim 7, further comprising:
    balancing, by the CCRM, a processing load between a first instance of the process and the second instance of the process.

10. The method of claim 1, wherein managing the distribution of resources among the plurality of cloud computing servers comprises:

identifying, by the CCRM, an event associated with an increase of existing network timing delays associated with at least one of the first, the second, or the third communication links;

determining, by the CCRM, the respective network timing delay threshold; and further managing the distribution of resources based at least in part upon the identified event.

11. The method of claim 1, further comprising:

determining, by the CCRM, respective priorities for a first process and second process included in the one or more processes, wherein managing the distribution of resources comprises managing the distribution of resources based at least in part upon the determined priorities.

12. The method of claim 1, further comprising:

generating, by the CCRM, a utilization report associated with at least one of the plurality of available cloud computing servers.

13. A system, comprising:

at least one memory operable to store computer-executable instructions; and at least one hardware processor configured to access the at least one memory and execute the computer-executable instructions to:

identify a plurality of available cloud computing servers;

identify one or more processes executed on a first server of the plurality of cloud computing servers in communication with a second server of the plurality of cloud computing servers over a first communication link, and the second server in communication with a third server of the plurality of cloud computing servers over a second communication link, wherein the execution is in response to a request from a client device that is remote from the plurality of cloud computing servers;

obtain operational data associated with the operation of the one or more processes and network data associated with respective network timing delays associated with the first communication link and between the first server and the second server, the second communication link and between the second server and the third server, and a third communication link, the third communication link connecting the client device to at least one of the plurality of cloud computing servers, wherein the operational data comprises one or more indications associated with a resource threshold associated with the first server, the second server, or the third server, wherein the one or more indications comprise an indication that a resource requirement of the first server, the second server, or the third server has exceeded the resource threshold or an indication that a resource requirement of the first server, the second server, or the third server is expected to exceed the resource threshold; and manage, based at least in part upon the operational data and the network data, the distribution of resources among the plurality of cloud computing servers, wherein the managing comprising comparing, by the CCRM, the network timing delays with a respective network timing delay threshold to determine the distribution.

14. The system of claim 13, wherein the plurality of available cloud computing servers comprises a plurality of servers associated with a cable distribution network.

15. The system of claim 13, wherein the operational data comprises at least one of (i) data associated with allocated memory resources, (ii) data associated with available memory resources, or (iii) data associated with processor utilization.

16. The system of claim 13, wherein the obtained operational data comprises an indication that the resource requirements of at least one of the first server, the second server, or the third server have exceeded the network timing delay threshold or that the resource requirements are expected to exceed the network timing delay threshold.

17. The system of claim 13, wherein the one or more processes comprise one or more first processes having associated cloud interface functionality, and wherein the at least one processor is further configured to execute the computer-executable instructions to:

obtain data associated with the resource requirements of one or more second processes operating on at least one of the first server, the second server, or the third server, wherein the one or more second processes are not associated with cloud interface functionality; and manage the distribution of resources based at least in part upon the data associated with the one or more second processes.

18. The system of claim 13, wherein the at least one processor is configured to manage the distribution of resources by executing the computer-executable instructions to:

identify a process included in the one or more processes that requires additional resources; and allocate additional resources to a server executing the process.

19. The system of claim 13, wherein the at least one processor is configured to manage the distribution of resources by executing the computer-executable instructions to:

identify a process included in the one or more processes that requires additional resources, wherein the process is executing on the first serve; and direct initiation of a second instance of the process on a fourth server included in the plurality of cloud computing servers.

20. The system of claim 19, wherein the at least one processor is further configured to execute the computer-executable instructions to:

direct at least one of (i) a transitioning of the process from the first server to the fourth server or (ii) a balancing of a processing load between a first instance of the process and the second instance of the process.

21. The system of claim 13, wherein the at least one processor is configured to manage the distribution of resources by executing the computer-executable instructions to:

identify an event associated with an increase of existing network timing delays associated with at least one of the first, the second, or the third communication links;

determine the respective network timing delay threshold; and further manage the distribution of resources based at least in part upon the identified event.

22. The system of claim 13, wherein the at least one processor is further configured to execute the computer-executable instructions to:

determine respective priorities for a first process and second process included in the one or more processes; and manage the distribution of resources based at least in part upon the determined priorities.

23. The system of claim 13, wherein the at least one processor is further configured to execute the computer-executable instructions to:

generate a utilization report associated with at least one of the plurality of available cloud computing servers.

* * * * *